F. H. WOLEVER.
PROCESS OF MAKING ROLLERS.
APPLICATION FILED APR. 21, 1917.
1,318,520.
Patented Oct. 14, 1919.
7 SHEETS—SHEET 1.
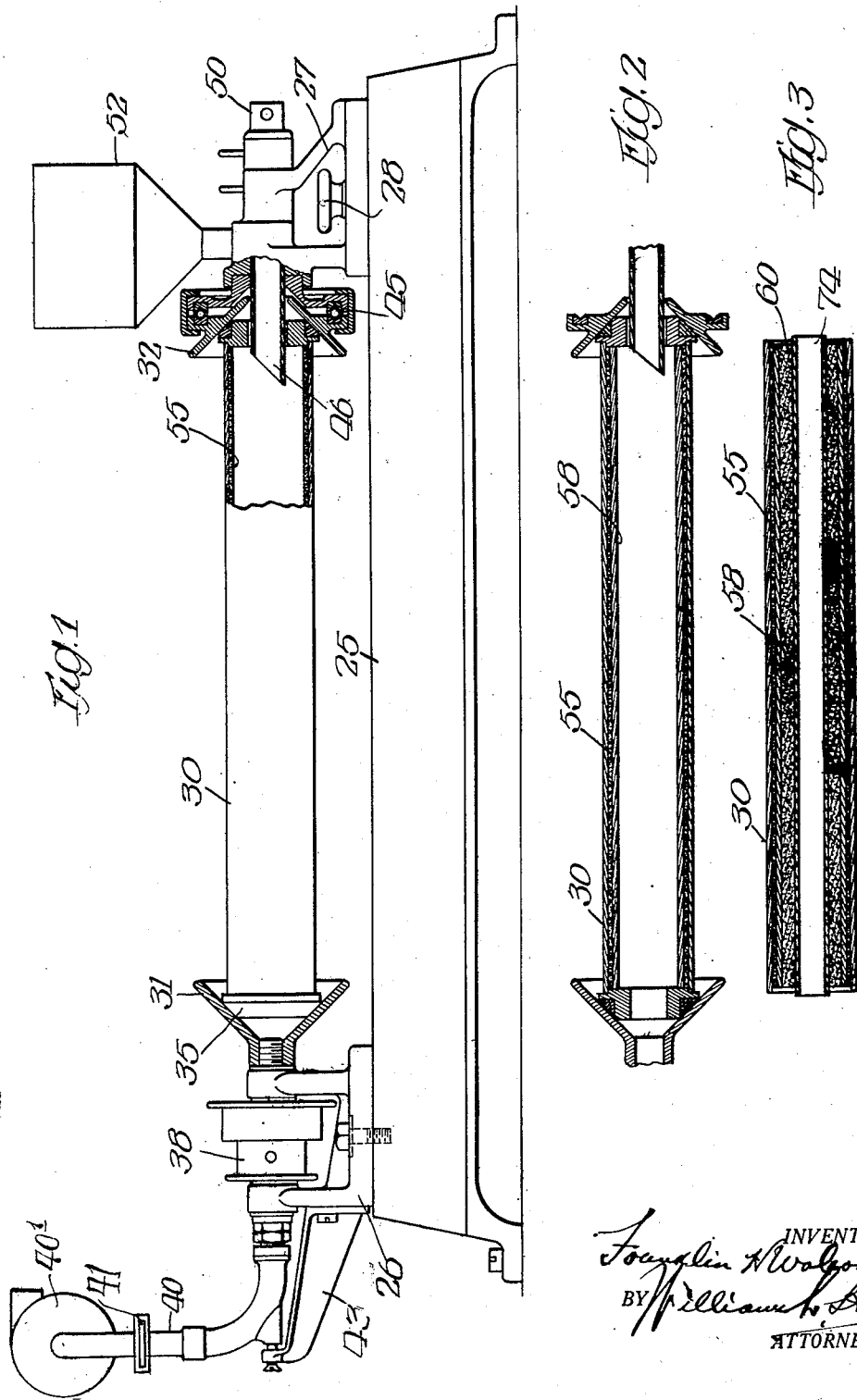

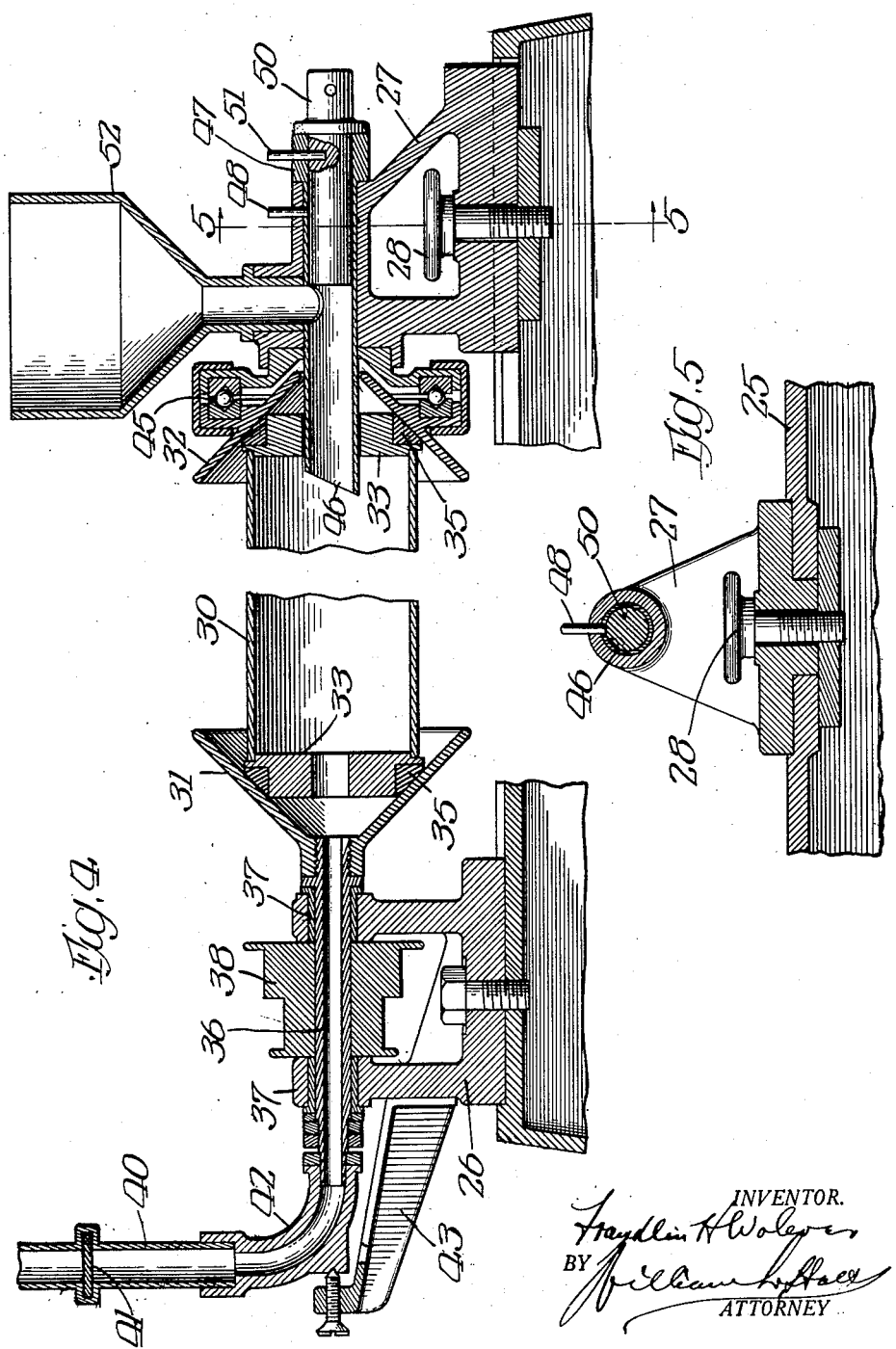

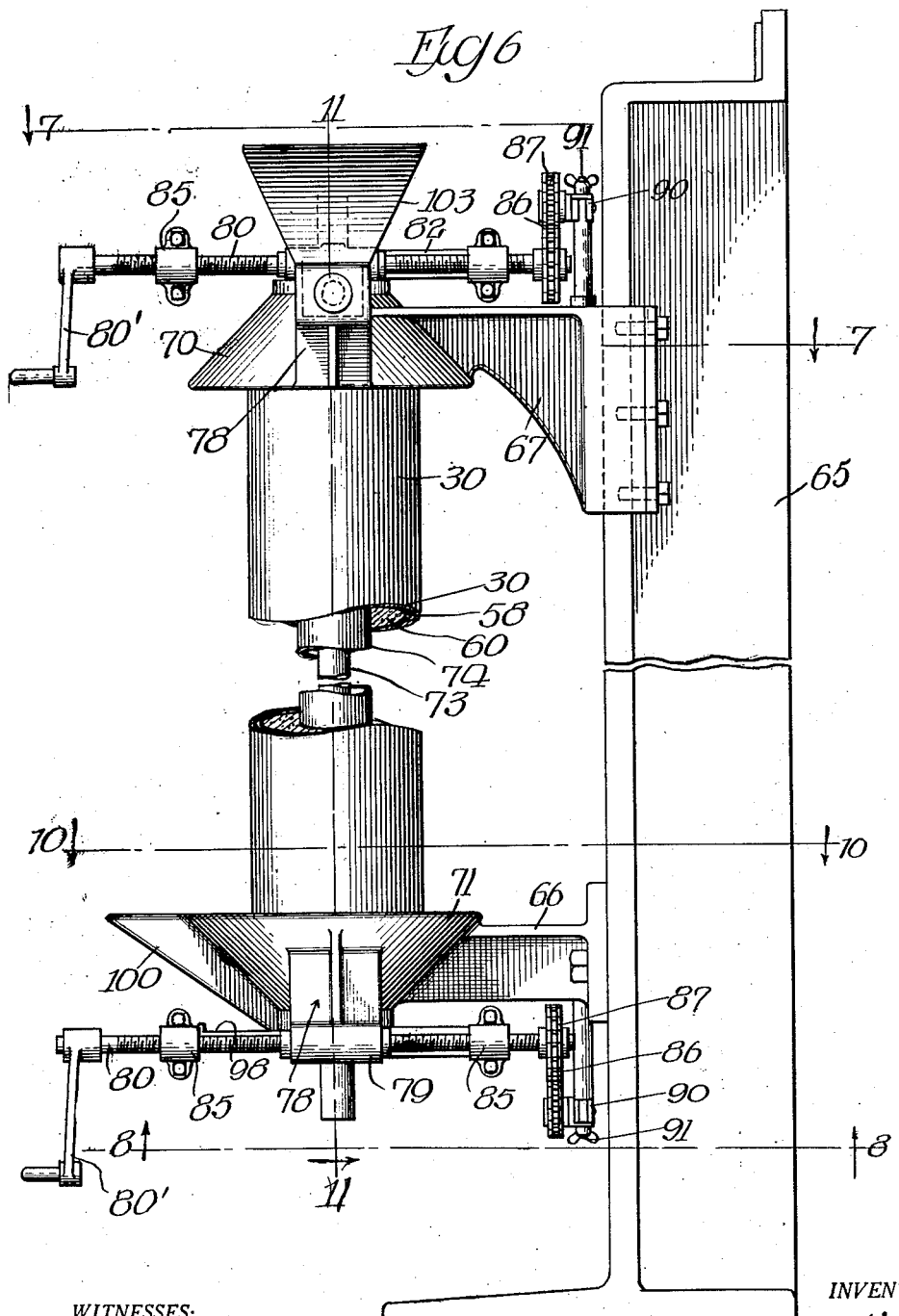

F. H. WOLEVER.
PROCESS OF MAKING ROLLERS.
APPLICATION FILED APR. 21, 1917.
1,318,520.
Patented Oct. 14, 1919.
7 SHEETS—SHEET 4.
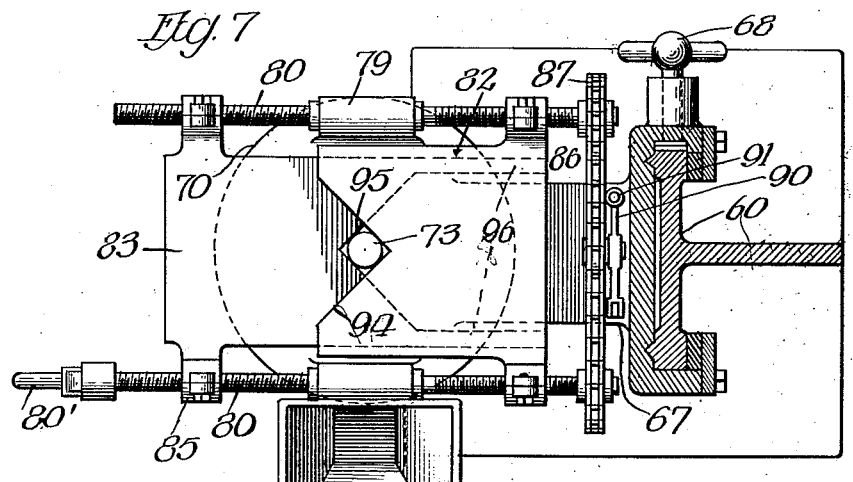
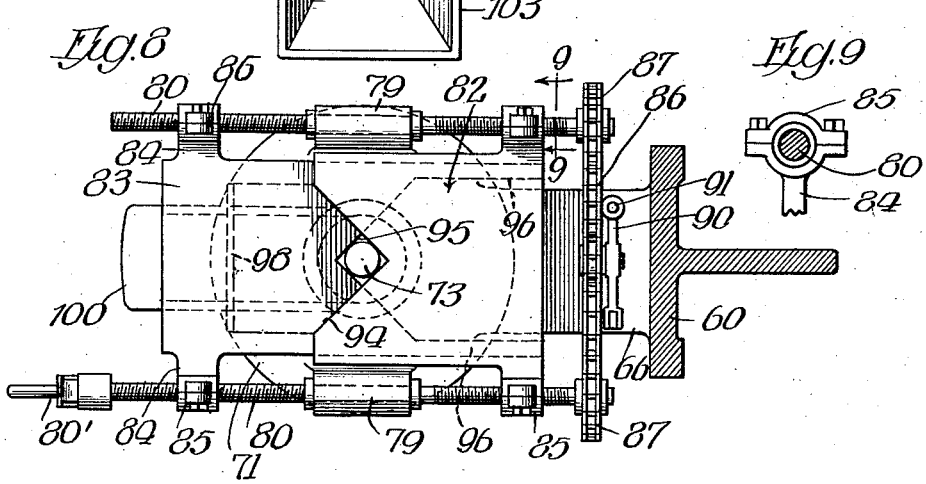
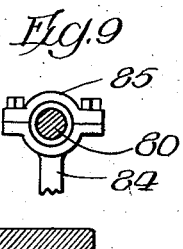
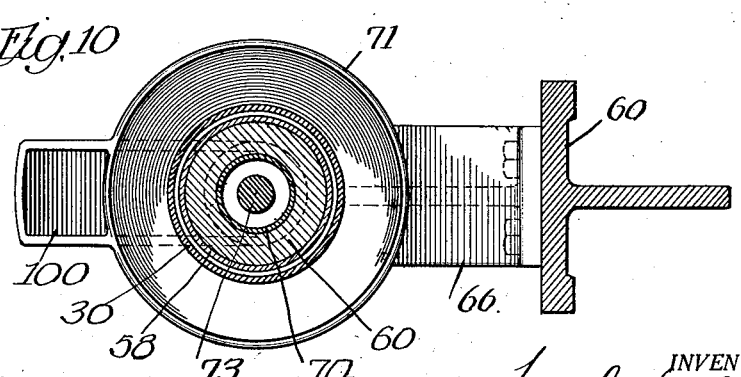
WITNESSES:
INVENTOR.
ATTORNEY.

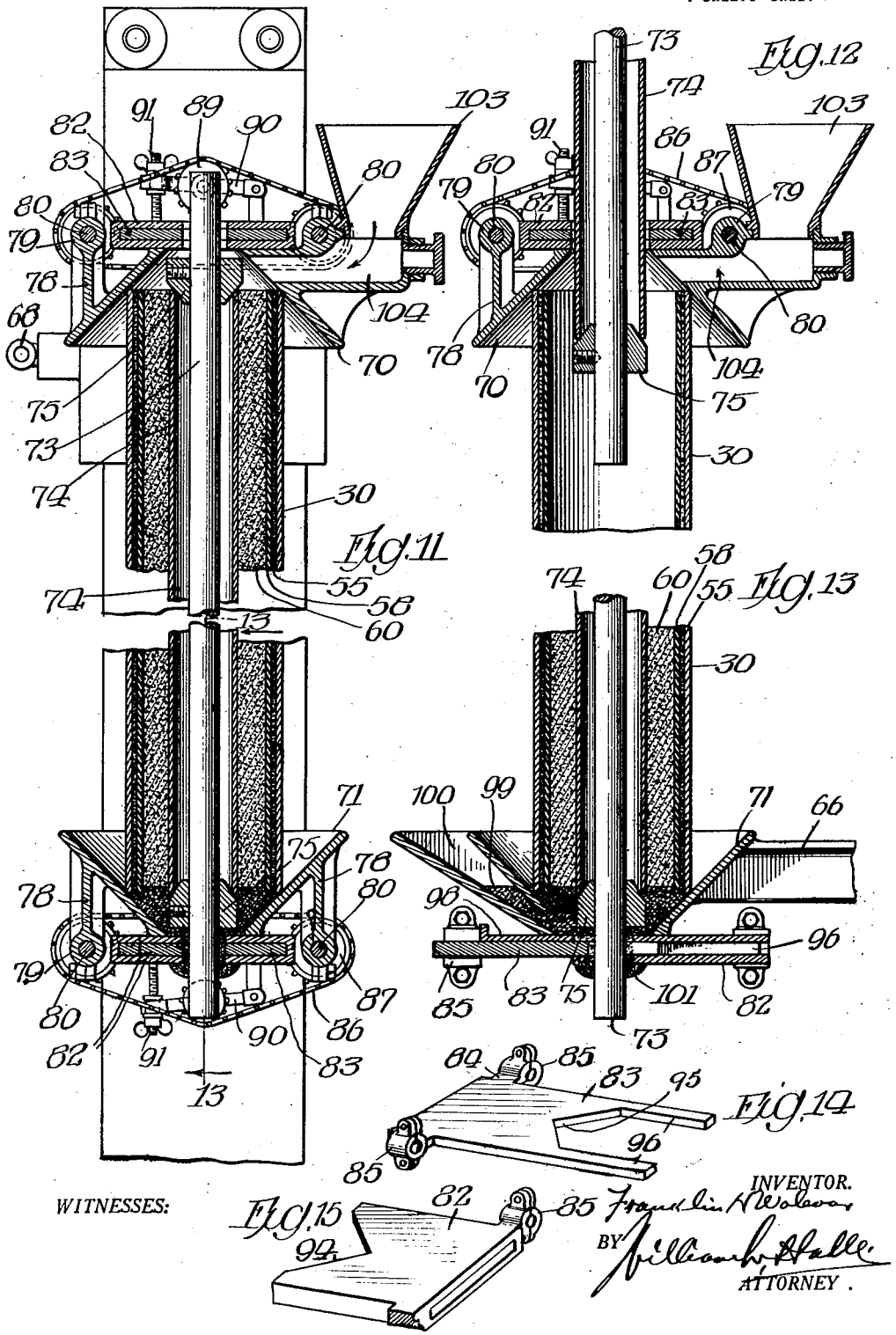

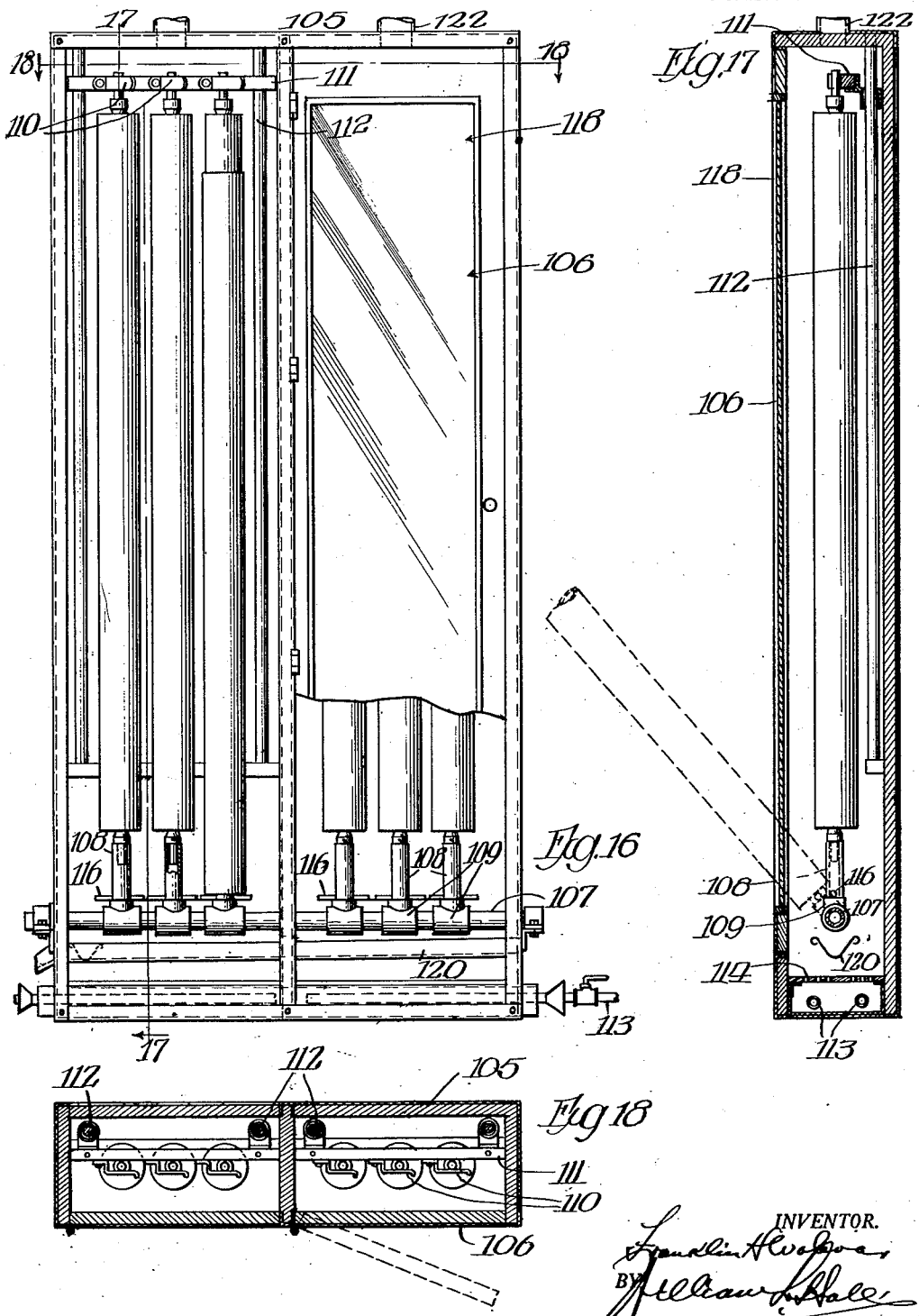

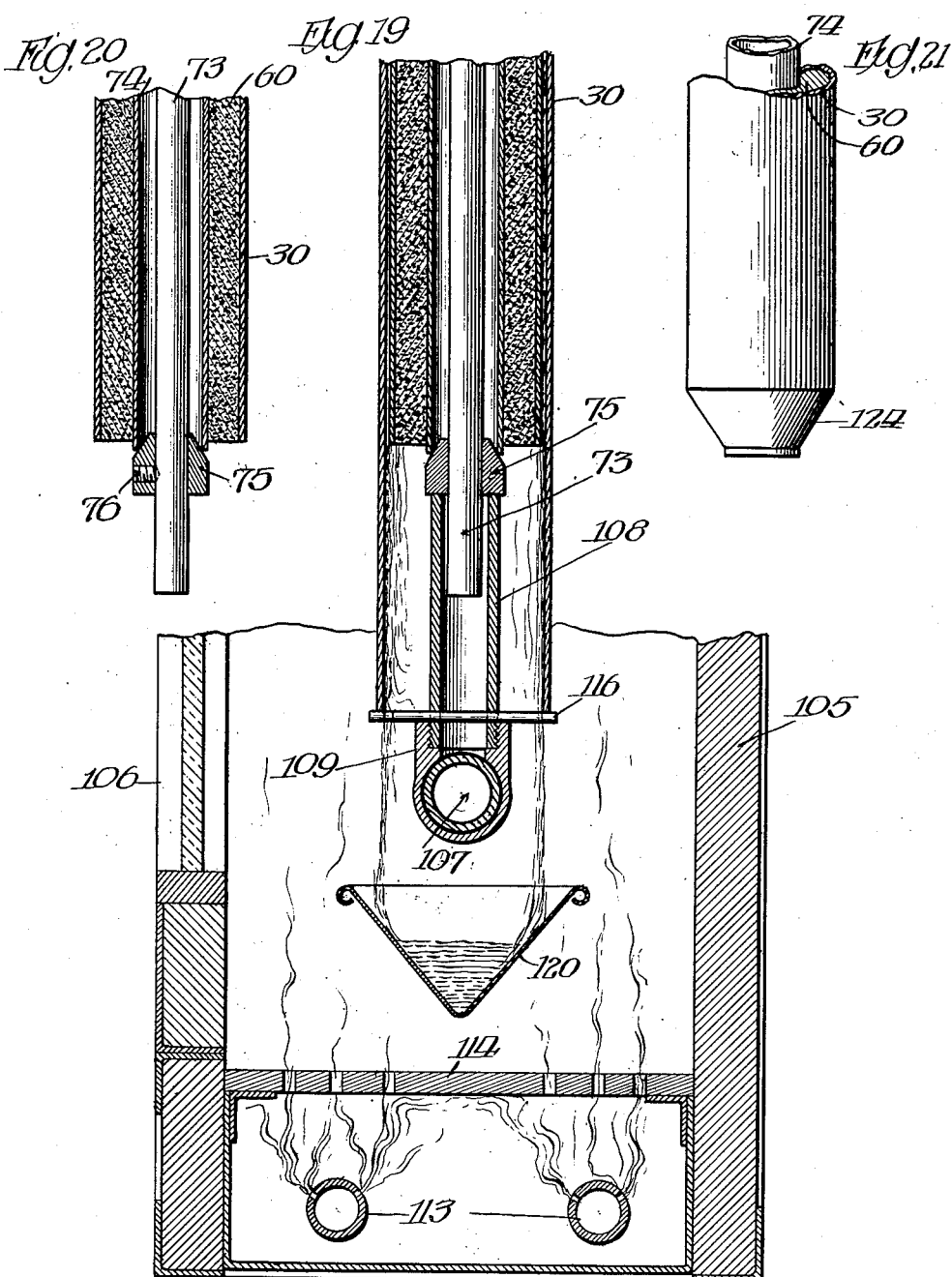

UNITED STATES PATENT OFFICE.

FRANKLIN H. WOLEVER, OF CHICAGO, ILLINOIS, ASSIGNOR TO IDEAL ROLLER CO., OF CHICAGO, ILLINOIS, A CORPORATION OF DELAWARE.

PROCESS OF MAKING ROLLERS.

1,318,520.  Specification of Letters Patent.  Patented Oct. 14, 1919.

Application filed April 21, 1917. Serial No. 163,579.

*To all whom it may concern:*

Be it known that I, FRANKLIN H. WOLEVER, a citizen of the United States, and a resident of Chicago, in the county of Cook and State of Illinois, have invented certain new and useful Improvements in Processes of Making Rollers; and I do hereby declare that the following is a full, clear, and exact description thereof, reference being had to the accompanying drawings, and to the characters of reference marked thereon, which form a part of this specification.

This invention relates to a novel process for producing a compound roller for printing presses, typewriting machines, clothes wringers and other uses, such as is shown and described in my prior U. S. Letters Patent, No. 1,161,756, granted November 25th, 1915.

A roller embodying my invention embraces a central core of high resiliency and an outer or face layer of tough exterior formed on the core, said core and face layer being preferably composed largely of vulcanized oil and intimately bonded together. Said roller is especially adaptable for use as an ink distributing roller for printing presses, in which use it is subjected to wide ranges of temperature and humidity and to destructive action of type, and wherein the requirements are for a roller which will retain its contour and a uniform density and texture under all practical conditions of use and from which ink may be rapidly and completely removed.

Heretofore various attempts have been made to produce distributing rollers for printing presses of a character to withstand the variable conditions of temperature and humidity of the surrounding atmosphere, ink and mechanical conditions to which such rollers are subjected and of a character to enable the roller to be operated equally well at low and high speeds, so as to prevent distortion of the cross section of the rollers and variableness in diameter both when in use and when stored in the racks; and also of a character to permit the ink to be readily and completely removed therefrom after use. Such efforts, so far as I am aware, prior to the development of the roller described in my former U. S. Letters Patent, have not resulted in a roller possessing the characteristics desired.

It is among the objects of my present invention to simplify and reduce the cost of manufacturing such rollers and to reduce the time required to manufacture the roller.

A further object of the invention is to provide a process that will produce a perfect roller face without the necessity of a grinding operation and to provide a process for making such rollers, wherein the mold liner is not melted or broken down by the vulcanizing temperature of the roller shell material as the material is thrown out against and formed on the liner.

Another object of the invention is to provide a novel process of forming the liner on the mold wall in such a way as to avoid cracking and checking of the liner and resultant irregularities in the face of the roller shell, and by which to provide an elastic liner which will adhere to the mold wall and which will stretch when the roller shell contracts to avoid checking of the shell face and parting of the liner from the mold.

Other objects of the invention are to improve and simplify the manufacture of rollers, as will more fully hereinafter appear.

The material from which my improved roller is made is preferably a vulcanized oil, such as corn oil, linseed oil, or other oil which can be vulcanized. The core and the outer layer or shell of the roller may be made from the same character of oil, or the outer layer or shell may be made of a better grade oil. For instance, when using corn oil for the core, linseed oil may be employed for the shell. The core should possess a comparatively high resilience, while the outer layer or shell is tough and homogeneous. It is necessary in order to produce this tough or homogeneous outer layer that, after the material has been poured into the mold, and before it solidifies, all the air, gas and moisture, or as nearly as may be, shall be driven therefrom. The roller face is, therefore, anhydrous so that it will not become deformed or shrunkened or hardened by elimination of moisture, and said material possesses no affinity for moisture, so that the roller will not become deformed, enlarged and softened by the absorption of moisture. An advantage realized in driving the air and moisture from the outer layer resides, not only in making the layer moisture proof, but is also valuable because the surface itself is thereby free from air holes and like irregularities.

In producing a roller in accordance with my novel process, I first line the cylindric or other form of mold to produce a smooth solid lining. This may be effected by pouring into the mold a quantity of melted paraffin or like material and simultaneously rotating the mold at high speed so as to throw the melted paraffin outwardly against the inner cylindric wall of the mold which, upon hardening, produces a lining. Thereafter the material to form the outer or shell layer of the roller is poured into the mold thus lined and the mold continues to rapidly rotate so that the said layer forming material is thrown outwardly by centrifugal forces against the forming face of the mold lining. This centrifugal force developed during the rotation of the mold acts to force the air, gases and moisture from the material before it becomes solidified, thereby producing a tough homogeneous layer which is free from moisture and air holes and is peripherally smooth and symmetrical. The liner material is so tempered that it is elastic so that it will slightly yield when the shell contracts relatively to the mold wall, and so also that the liner will adhere to the mold wall during such yielding or stretching of the liner material. Therefore a smooth face for the shell is assured. Thereafter the material to constitute the inner elastic core is poured into the formed shell before it is removed from the mold, the mold being set upright for this purpose, and if a stock is to be incorporated in the roller said stock is properly centered in the mold prior to pouring the core material. This core material may be poured in any suitable manner. Thereafter, heat is applied to the mold lining in contact with which the outer layer has been formed and on which it is hardened so as to melt said lining to an extent to release the finished roller and permit it to be pulled endwise from the mold.

If desired, the core material may be cast on an adapter tube at the factory having the fastening and centering means by which the roller thus formed may be fastened to the stock at the printing shop. When this process of manufacture is followed, I proceed as follows after the shell layer has been formed:

The end caps of the mold are removed and the mold is placed in an upright position upon a suitable support. Thereafter a centering shaft or stock and an adapter tube is placed within the formed shell and centered therein and supported in fixed relation to the mold. Thereafter the core material is poured into the space between the adapter tube and the shell to produce the core, the core material bonding itself to the shell end tube.

Thereafter the mold is subjected to heat to fuse the paraffin liner and to thereby permit the roller to be removed from the mold. If desired a higher heat may be applied to the roller for a period necessary to further melt and volatilize the paraffin from the roller surface and to toughen said surface. The roller may be thereafter again treated one or more times with partially volatile oil in fluid state and subjected to heat until the surface attains the proper state of toughness necessary for the purpose intended. The roller is now complete and is ready to be attached to the roller stock.

In the drawings, showing a specific form of machine which I have chosen to illustrate my invention:—

Figure 1 is a side elevation of the shell molding machine, partly in section to show the mold liner.

Fig. 2 is an axial section of the mold after the shell layer has been formed.

Fig. 3 is a similar view showing the complete roller and adapter tube, still in the mold and ready to be drawn.

Fig. 4 is an enlarged axial section of the machine, broken away between its ends.

Fig. 5 is a section on line 5—5 of Fig. 4.

Fig. 6 is a broken away side elevation of the core casting machine.

Figs. 7 and 8 are sections on lines 7—7 and 8—8, respectively, of Fig. 6.

Fig. 9 is a detail section on the line 9—9 of Fig. 8.

Fig. 10 is a section on the line 10—10 of Fig. 6.

Fig. 11 is a broken axial section on the line 11—11 of Fig. 6.

Fig. 12 is a like section of the upper end of the mold, showing the manner of inserting the centering stock and adapter tube in the mold.

Fig. 13 is an axial section on the line 13—13 of Fig. 11.

Figs. 14 and 15 are perspective details of the stock centering plates.

Fig. 16 is a side elevation, with parts broken away, of the furnace in which the liners are fused to remove the molds from the completed rollers and the rollers heated to melt and volatilize the liner material.

Figs. 17 and 18 are sections on the lines 17—17 and 18—18, respectively, of Fig. 16.

Fig. 19 is an enlarged sectional detail of the said furnace and one of the molds therein.

Figs. 20 and 21 are sectional and elevation details, respectively, of the completed roller.

The frame of the shell molding machine shown in Figs. 1 to 5, inclusive, comprises a bed 25 and head and tail stocks 26, 27 respectively, the latter of which is adjustable longitudinally of the bed and is locked thereto by a screw 28.

The cylindric rotative shell mold 30 is supported at its ends by conical centering members 31, 32, the mold being provided with end closing caps 33, which are annularly recessed to receive friction rings 35 that bear directly against the inner faces of said conical centering and supporting members. The centering member 31 is apically apertured and is fixed to a rotative drive shaft 36, shown as hollow to provide for the escape of gases from the mold through the apical aperture; and said shaft is mounted in suitable bearings 37 of the head stock. Power is transmitted to said shaft to rotate the mold by means of a pulley 38. A pipe 40 to provide for the escape of gas from the mold, and provided with a valve 41, is connected by an elbow fitting 42 with said hollow drive shaft by a rotative joint, and is supported from the head stock by a bracket 43.

The opposite conical centering and supporting member 32 is supported through a suitable antifriction bearing 45 on the tail stock so as to rotate freely with respect to the tail stock. It is provided with an apical opening through which and the opening of the adjacent end cap extends a feed tube 46, which latter is removably seated in a horizontal bore in the tail stock and is provided with a shouldered outer end 47 that limits the inward movement of the tube. Said tube is locked to the tail stock by a removable pin 48 and is closed at its outer end by a plug 50, which may be locked to the shouldered end of the tube by a pin 51. Removal of the plug 50 affords access to the tube to clean the same. Upon removal of the pin 48 the said plug and tube, locked together by the pin 51, may be removed together for a more complete cleaning of the tube. The tube is apertured between its ends for communication with the outlet of a funnel 52 that is supported on the tail stock, and through which the liner and shell materials are poured into the mold.

The centrifugal casting machine described is not herein claimed but is made the subject of a separate application divided herefrom, Serial Number 179,420, filed July 9, 1917.

After the mold has been assembled and is set in rotation, a quantity of the liner material, such as a paraffin wax compound, which has been accurately measured to produce a liner of a given internal diameter, is poured through the funnel 52 into the rotating mold, and centrifugal force developed by the rotation of the mold causes the liner material to form against the wall of the mold to produce a liner 55 of uniform thickness.

In order to prevent the liner material from cracking or checking, due to its contact with a cool mold wall, the mold may be heated to such a temperature above the room temperature as to prevent chilling of the liner material so as to allow the liner when formed against the mold wall to cool uniformly throughout its thickness and to thereby assist in avoiding internal strains which may develop checks or cracks. A further advantage of preliminarily heating the mold is that the rise in temperature serves to slightly expand the mold whereby, upon cooling, the mold wall contracts upon the cooling liner and partly compensates for the shrinking of the liner due to its cooling. If the liner material be thrown outwardly against a cold mold wall there is a tendency for the liner, upon cooling, to shrink away from the wall, with the result of objectionally loosening the liner in the mold. The liner is moreover elastic and is made of material that clings to the mold wall, as hereinafter described, so that the contracting of the shell does not have the effect of parting the liner from the mold wall when the roller shell is formed therein.

After the liner is formed and hardened, the material to form the shell layer of the roller, which previously has been prepared by a partial vulcanizing process, is mixed with a further vulcanizing agent such as sulfur chlorid, and is poured through the funnel into the rotating lined mold; the charge of material having been accurately measured by a suitable measuring instrument to produce a shell of proper thickness and diameter to correspond with the overall diameter of the roller and other conditions. The mold continues to rotate at a suitably high speed, of five hundred or more revolutions per minute, until the shell material has been forced outwardly against the liner to form a shell 58 of uniform thickness and has hardened to maintain permanent shape. The heat of vulcanization raises the temperature in the mold, and the resultant gases pass from the material to the interior of the shell and outwardly through the escape pipe 40. Likelihood of gases being pocketed in the shell is thereby avoided and the shell is formed with a very smooth outer surface of homogeneous texture and free from moisture. Air may be circulated through the mold at high speed while the shell is being formed, as by means of a fan 40' connected to the pipe 40, so as to properly cool the shell material. Circulation of air through the mold while the liner is being formed and hardened is not required and the valve 41 will be closed while the liner is being formed.

The proportions of the vulcanizing agent and oil depend largely upon the kind of oil used. For example, for the shell, linseed oil mixed with about 30 to 35 per cent. by weight of sulfur chlorid may be used. The vulcanization takes place at ordinary temperatures in a short time, generally within about one minute of the mixing, requiring the mixing and pouring to be done quickly.

This temperature may range all the way from 130° F. up.

In order to lengthen the time of vulcanization or hardening and to keep the temperature down, it is generally preferred to vulcanize in two stages,—that is to say, I may first add part of the sulfur chlorid, as about one half to one third of the total amount required, to the oil, and allow partial vulcanization to take place, and then let the partly vulcanized oil, which is still in liquid condition, cool, and give the final vulcanization when the roller is molded. In this manner the time of vulcanization may be increased, the temperature of reaction decreased, and thus keep the vulcanizing process under control.

If oils other than linseed oil be used, the amount of sulfur chlorid generally requires to be changed. For example, rape seed oil requires about twenty-five per cent. sulfur chlorid, and the temperature reached during vulcanization ranges up to about 180° F. Corn oil behaves in a similar manner.

The sulfur chlorid is usually undiluted, although it may be diluted with benzin, gasolene, kerosene, carbon disulfid, benzol, or any other diluent in any desired proportion. Such dilution will increase the time required for vulcanization or hardening and will reduce the temperature of the chemical reaction. The diluent may be mixed with the sulful chlorid, or with the oil, or both.

The time required for vulcanization; that is, the time which it is necessary to allow the mold to stand before the roller has hardened, depends largely upon the conditions under which the work is done. As a general rule, the shell may harden in about four minutes while the core, which is generally vulcanized to a less extent, may require from ten to thirty minutes.

The liner material is of such character, or is so treated prior to the formation of the liner, as by the addition of a readily miscible agent having a higher melting temperature than the liner material, such as a mineral or vegetable wax or gum, resin, and the like, that the fusing temperature of the hardened liner is relatively higher than the vulcanizing temperature of the shell material, but considerably lower than the fusing point of the shell after it has set. For example, ordinary paraffin wax having a melting point of about 130° may be used mixed with a small amount of carnauba wax having a melting point of about 180° F., thereby obtaining a wax mixture which melts at about 150° F. Or I may mix the paraffin wax with a suitable amount of ozokerite or ceresin which may be obtained of a melting point anywhere from between 130 to 170° F. and thereby obtain a wax mixture of almost any melting point desired up to almost 170°. It is found in general that a wax having a melting point of about 150° F. will resist the temperature of vulcanization of the roller without melting. This temperature is far below the melting point or temperature of decomposition of the roller material, which is above 300° F. In this manner the forming surface of the liner is maintained intact against breakdown under the action of the vulcanizing temperature of the shell while being formed which, should it occur to the slightest extent, would injure the face of the liner and consequently roughen the face of the shell and necessitate a grinding operation to properly finish the shell. Such grinding operation is objectionable for the reason that the overall diameter of the roller is thereby varied and uniformity of diameter cannot be assured. In the practice of my improved process the liner material is accurately measured before the material is poured to exactly produce a predetermined internal diameter of the liner, and by reason of the fact that the liner hardens with a firm, accurately dimensioned forming face, and by reason of the further fact that the forming face of said liner does not undergo textural change under the vulcanizing temperature of the shell material and is elastic when cooling, the resultant face of the shell is that of a true cylinder and is uniform in texture.

A further advantage of thus tempering the liner material so as to raise its melting or fusing point, and to thereby render it elastic, when cooling, is that air and gases entrained in the liner material are given time to be forced by pressure, due to centrifugal action, away from the inner face of the liner before the said material has substantially set or hardened. Should the material at the inner face of the forming liner set sufficiently to produce a thin skin while the body of the liner is still in a more or less flowable condition, the pressure developed by centrifugal action will have the effect of forcing globules of air and gas through the thin skin, with the result that the skin is broken and rendered irregular. This condition will necessitate a reaming or other finishing operation necessary to produce a true, regular forming face in the liner, resulting in an unnecessary increase of the cost of the roller. Moreover, such reaming operation is to be avoided for the reason that variable amounts of the material will require to be cut away in different liners, so that accurate internal diameter of the liner cannot be assured. With my improved process a liner having a smooth inner surface and accurate internal diameter is attained. The particular tempering agent mixed with the liner material depends upon the vulcanizing heat of the roller shell, it being apparent that the higher the heat of vulcanization of the shell, the higher fusing point of the liner will be required. Furthermore the higher the fusing point of the liner material the more gradually it will solidify, so that it will more gradually pack and harden to produce a non shrinkable smooth surface. By reason of the gradual solidification of the liner material it retains an elastic character during an adequate forming period, and also during the vulcanizing period, which avoids checking or rupturing of the texture of the liner.

After the shell hardens the mold is placed in an upright position in a core casting machine, after which the material is poured into the shell to produce the core or body 60 of the roller. The casting machine is shown in Figs. 6 to 15, inclusive, and is made as follows:

65 designates a standard or support which carries toward its lower end a fixed bracket 66 and toward its upper end a vertically adjustable bracket 67, which latter is locked in adjusted positions by a screw 68. Said brackets 66, 67, carry upper and lower hollow cone shaped mold centering and supporting members 70, 71, respectively, which engage the upper and lower ends, respectively, of the mold 30. The mold is assembled in the machine by moving the upper bracket 67 and its centering member upwardly the required distance, placing the mold in the lower centering member and thereafter adjusting the upper bracket and centering member to the upper end of the mold.

Associated with said mold centering and supporting devices are upper and lower centering devices for the roller stock 73 and adapter tube 74, if the latter be employed. The adapter tube, when employed, is embedded in the roller when the roller proper is made at the factory, and is applied to the stock at the printing shop. In this practice the complete roller, adapter tube and stock is shown in Fig. 18 when ready for use, wherein it will be observed that the stock 73 is centered in the adapter tube by means of centering cones 75, which are fixed to the stock by set screws 76. The same character of stock and centering cones are used at the factory for the purpose of properly centering the adapter tubes in the core molding machine previous to the core cast. The stock centering means shown may also be employed where the adapter tube is omitted and the stock embedded directly in the core. Said stock centering devices are made as follows:

The printers' roller embodying the adapter tube described is not herein claimed, but is made the subject of a divisional application filed July 9, 1917, Serial Number 179,419.

78, 78 designate lugs or brackets which are made integral with and extend upwardly and downwardly, respectively, from the upper and lower centering and supporting members 70, 71, respectively. Each pair of lugs carry bearings 79 for a pair of oppositely extending, right and left hand screw threaded shafts 80; said shafts being rotatively mounted in the bearings 79 but endwise immovable therein. Associated with each pair of shafts and extending across the open apical ends of the members 71, 72, are sliding, overlapping, stock centering and mold closing plates 82, 83, respectively, the former being made hollow to receive the latter. Said plates are provided with laterally extending lugs 84, which carry split or divided nuts 85, the parts being so arranged that when the screw shafts 80 are turned, as by cranks 80', the centering plates are moved toward or from each other, depending upon the direction of rotation of the shafts. Preferably the shafts are geared together, as by a sprocket chain 86, engaging sprocket wheels 87 carried by corresponding ends of the shafts of each pair. Said sprocket chains are tensioned by tension devices embracing idle rollers 89 carried by swinging arms 90 which are adjusted and held in place by means of threaded portions engaging screws 91.

The proximate ends of the plates 82, 83 of each pair are formed to provide V-shaped notches 94, 95, the margins of which are spaced at such relatively wide angles with respect to each other that when the plates are moved away from each other a large diamond shaped opening is formed between said V-shaped ends; said openings being at least as large as the apical openings of the centering and supporting members 71, 72, so that when the plates are thus opened at the top of the machine sufficient space is provided to admit the adapter tube 74. Preferably the single thickness plates 83 are provided at the terminals of their V-shaped notches with guide arms 96 of such length as to remain in engagement with the hollow centering plates 82 when said plates are most widely separated.

Inasmuch as the bottom centering plates constitute, in connection with the adjacent mold centering and supporting member 71, the bottom of the mold chamber, it becomes desirable to place a filler plate 98 over the single thickness centering plate 83 so as to avoid a space between the single centering plate and the lower edge of the conical mold centering member 71.

In centering the stock and adapter tube, the upper centering plates are separated to an extent to permit the tube to pass therebetween, the lower plates being separated only a sufficient distance to permit the stock to extend through the opening between them. The tube and stock are then lowered until the upper end of the stock is in the plane of the upper centering plates. Thereupon the upper centering plates are moved together to center the upper end of the stock and tube. Thereafter the lower centering plates are moved inwardly against the lower end of stock to complete the centering of the stock and tube.

After the stock has been thus centered the lower portion of the lower centering and supporting member 71 is filled with a body of waxy material 99 of such character as to close against the escape of the core material when it is later poured into the mold.

The said waxy substance is poured into the lower centering and supporting member 71 after the mold has been assembled in the casting machine, through an opening or hopper 100, shown as made integral with said member and the opening around the lower end of the stock 73, due to the angular edges of the centering plates fitting against the cylindric stock may be first closed by a lump 101 of like material. The core material is then poured into the upper end of the space in the mold between the shell and adapter tube through a hopper 103 and a conduit 104. Said conduit is closed by an end plug, the removal of which permits access to the conduit to clean or clear the same. After the core material hardens to form the core 60 the upper and lower stock centering devices are released from the stock and the screw 68 is loosened to permit the upper bracket 67 and the upper centering and supporting member 71 and the parts carried thereby to be raised sufficiently to release the upper end of the mold and the assembled centering stock, whereupon the mold may be lifted from the casting machine.

The vertical casing machine described is not herein claimed, but is made the subject of a divisional application filed on the 9th day of July, 1917, Serial Number 179,421.

After the molds and contained rollers have been removed from the casting machine they are placed in a furnace 105 wherein the liners are fused to strip the molds from the rollers. Said furnace may be made of any preferred construction, as shown it comprises one or more closed compartments having a door or doors 106 by which access may be had thereto. A convenient means, among others, for supporting the molds and contained rollers in the furnace consists in providing at the bottom of the furnace a horizontal shaft 107 equipped with a plurality of upwardly opening socket members 108 that are rotatively mounted, as by means of fittings 109, on the shaft 107 to swing in a plane transverse to the plane of said shaft. The lower ends of the stocks 73 are placed in said upwardly opening sockets and are supported thereby, and said molds may be held in upright positions in the furnace by means of clips 110 at the top of the furnace which are carried by a transverse bar 111 which may be supported by the upper ends of upright rods 112. The said clip bars are vertically adjustable on the rods to accommodate roller stocks of different lengths.

The furnace is heated from any suitable source of heat, as gas, steam coils or electric energy. The heating device herein shown consists of one or more burner pipes 113 at the bottom thereof and located beneath a perforated hearth 114. Said socket members 108 are provided near their fittings 109 with transverse pins 116 which are located a distance below the lower ends of the molds when the latter are assembled in the furnace. The heat from the burner causes the mold liners to fuse so as to free the molds from the rollers; the products of combustion passing away from the furnace through the exhaust pipes or flues 122. By reason of the upright position of the molds when so supported said molds drop by gravity downwardly from the rollers against and are supported by the transverse pins 116 when the liners are fused sufficiently to release the molds. The door of the furnace is preferably provided with a transparent window 118 through which the molds may be observed when supported in the furnace. When a mold is observed to drop, the door is opened and the stock of the mold is released from the sustaining clip 110, and the mold is swung outwardly in the manner indicated in dotted lines in Fig. 17, so that it may be stripped off of the roller. The melted liner material falls into an inclined trough 120 arranged below the series of molds and is thereby drained from the furnace to a suitable exterior receptacle (not shown).

After the molds have been stripped from the rollers, the rollers may be again adjusted in upright position in the furnace and sustained therein by the clips 110 and subjected to a further heat treatment from the burner. The furnace heat may be maintained at a suitable temperature and over a necessary period to melt and volatilize any of the liner material which may cling to the outer face of the roller shell, and which heat treatment also serves to toughen the surface of the shell. The furnace may be otherwise constructed and the mold otherwise inserted into and removed from the furnace. For instance, the molds may be removed from the rollers directly in the line of the axes thereof, and the rollers may be inserted into and removed from the furnace in groups in the manner of a continuous heat furnace.

The stripping furnace described is not herein claimed, but is made the subject of a divisional application filed July 9, 1917, Serial Number 179,422.

After the rolls have been thus treated they may be subjected to the grinding action of a suitable grinding implement by which the ends are ground off to produce the beveled or taper portions 124 shown in Fig. 21, the purpose of which is to suitably support the ends of the active portions of the roller.

I claim as my invention:

1. The improvement in the art of molding rollers which consists in the step of lining the roller mold with a material having a lower fusing point than that of the roller material, heating the mold prior to the lining operation, casting the roller in the lined mold and heating said liner to release the roller.

2. The improvement in the art of molding rollers which consists in the steps of lining the mold, heating the mold prior to the lining operation, supplying a roller shell layer material to the mold, applying the material to the mold lining by centrifugal action to produce a roller shell layer, expelling gases, air and moisture from the roller shell layer during its formation, and thereafter completing the roller.

3. The improvement in the art of molding rollers which consists in the steps of lining the mold. supplying a roller shell layer material to the mold, applying the material to the mold lining by centrifugal action to produce a roller shell layer, expelling gases, air and moisture from the roller shell layer during its formation, circulating a cooling and gas conveying air current through the mold during the formation of the shell layer, and thereafter completing the roller.

4. The improvement in the art of molding rollers which consists in applying to a heated mold wall by centrifugal action of a mold a liner having such a fusing point that air, gases and like foreign substances are forced by such centrifugal action from the liner material before the inner surface of the liner solidifies, to thereby avoid passage of such substances through and breaking up of the skin at the inner face of the liner at the period of first solidification thereof, and to thereby produce a smooth unbroken inner liner surface, thereafter casting the roller in the liner and thereafter displacing the liner to release the roller.

5. The improvement in the art of producing compound rollers consisting of an elastic core and a tough, homogeneous shell layer, which consists in the steps of forming a tubular face layer in the mold by centrifugal action and simultaneously effecting a vulcanization of the material of said layer, forcing air through the forming shell layer to cool the same and carry off gases therefrom, and thereafter molding the core within said tubular face layer.

6. An improved method of making rollers which consists in the steps of casting a mass of vulcanized oil to produce a roller, and thereafter subjecting the finished roller to heat treatment to toughen the face thereof.

7. The improved method of making rollers which consists in the steps of forming a tubular shell layer, forming the core therein and bonding it thereto, and thereafter subjecting the roller to heat treatment to toughen said face layer.

8. The improvement in the art of molding rollers, which consists in the steps of lining the roller mold with a material having a lower fusing point than the roller material, casting the roller in the lined mold, heating the liner to release the roller, withdrawing the roller from the mold, and thereafter subjecting the roller to the action of heat to melt and volatilize the liner from the roller surface.

9. The improvement in the art of molding rollers, which consists in the steps of lining the roller mold with a material having a lower fusing point than the roller material, casting the roller in the lined mold and heating the mold when in a vertical position to allow the mold to be released from the roller by gravity.

10. The improved method of making rollers which consists in the steps of forming a tubular shell layer, inserting an adapter tube therein, and thereafter forming the roller core between the shell layer and the adapter tube.

11. The improved method of making rollers which consists in casting the hollow shell layer of the roller by centrifugal action against a mold lining material having a lower fusing point than said shell layer, inserting an adapter tube into the hollow shell layer, thereafter molding the roller core between the shell layer and adapter tube, and thereafter applying heat to melt the lining to thereby release the roller.

12. The improved method of making rollers which consists in the steps of forming a tubular shell layer, inserting an adapter tube therein, centering said tube in the mold, forming the roller core between the adapter tube and shell layer, and thereafter withdrawing the roller from the mold.

In witness whereof I claim the foregoing as my invention, I hereunto append my signature in the presence of two witnesses at Chicago, Illinois, this 16th day of April, 1917.

FRANKLIN H. WOLEVER.

Witnesses:
  W. L. HALL,
  A. E. WALBRIDGE.